United States Patent
Dischler

(10) Patent No.: US 6,450,690 B1
(45) Date of Patent: Sep. 17, 2002

(54) LUBRICANT RESERVOIR INSERT FOR A BEARING HOUSING

(75) Inventor: Louis Dischler, Spartanburg, SC (US)

(73) Assignee: Delphi Oracle Corp., Spartanburg, SC (US)

( * ) Notice: Subject to any disclaimer, the term of this patent is extended or adjusted under 35 U.S.C. 154(b) by 0 days.

(21) Appl. No.: 09/667,376

(22) Filed: Sep. 22, 2000

(51) Int. Cl.[7] ................................................ F16C 33/66
(52) U.S. Cl. ........................ 384/462; 184/5.1; 184/6.4; 384/473
(58) Field of Search .............................. 184/5, 5.1, 6.4, 184/108, 109; 384/322, 462, 473

(56) References Cited

U.S. PATENT DOCUMENTS

| | | | | | |
|---|---|---|---|---|---|
| 890,735 | A | * | 6/1908 | Van Doren | 184/45.1 |
| 2,548,644 | A | * | 4/1951 | Wightman | 384/466 |
| 3,231,317 | A | * | 1/1966 | Dudar | 184/6.4 |
| 3,983,958 | A | * | 10/1976 | Swearingen | 184/108 |
| 4,317,341 | A | * | 3/1982 | Krude | 464/11 |
| 4,368,933 | A | * | 1/1983 | Motsch | 384/130 |
| 4,778,285 | A | * | 10/1988 | Larson | 384/322 |
| 4,784,500 | A | * | 11/1988 | Prokop | 384/462 |
| 4,854,748 | A | * | 8/1989 | Gabelli et al. | 184/6.4 |
| 5,052,827 | A | * | 10/1991 | Huiskamp et al. | 384/448 |
| 5,141,340 | A | * | 8/1992 | Van Tonder | 384/462 |

* cited by examiner

Primary Examiner—Thomas R. Hannon

(57) ABSTRACT

A compact lubricant reservoir for a bearing housing is provided whereby visual inspection of the reservoir indicates the level of lubricant reserve.

22 Claims, 7 Drawing Sheets

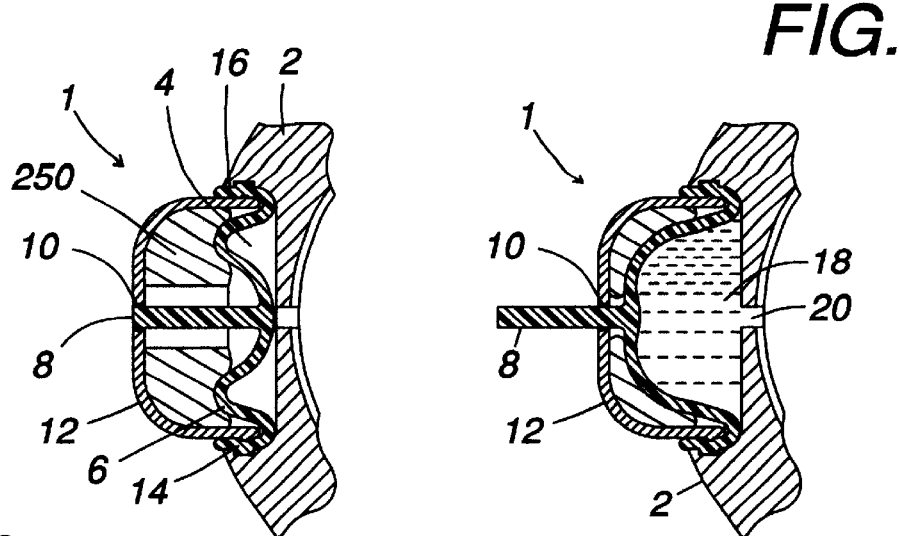
FIG. 1B
FIG. 1A
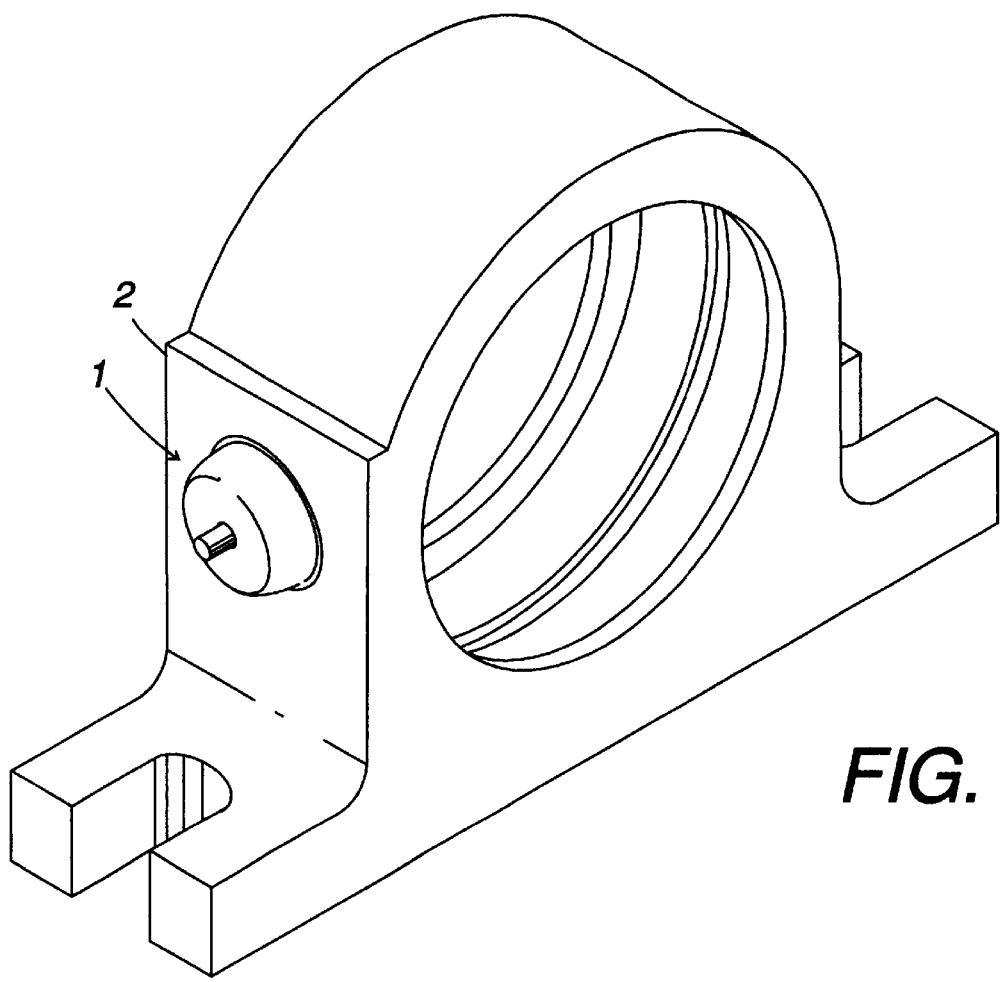
FIG. 2

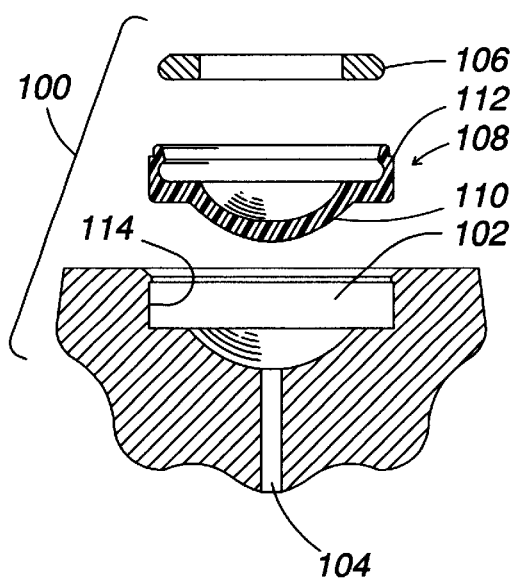
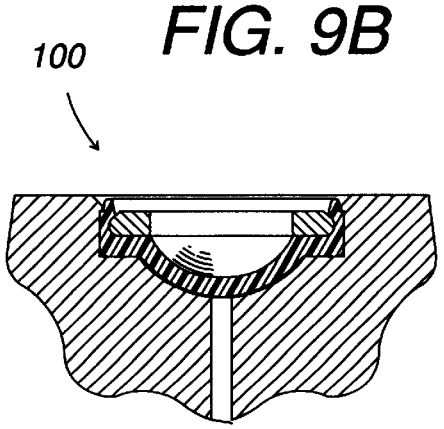
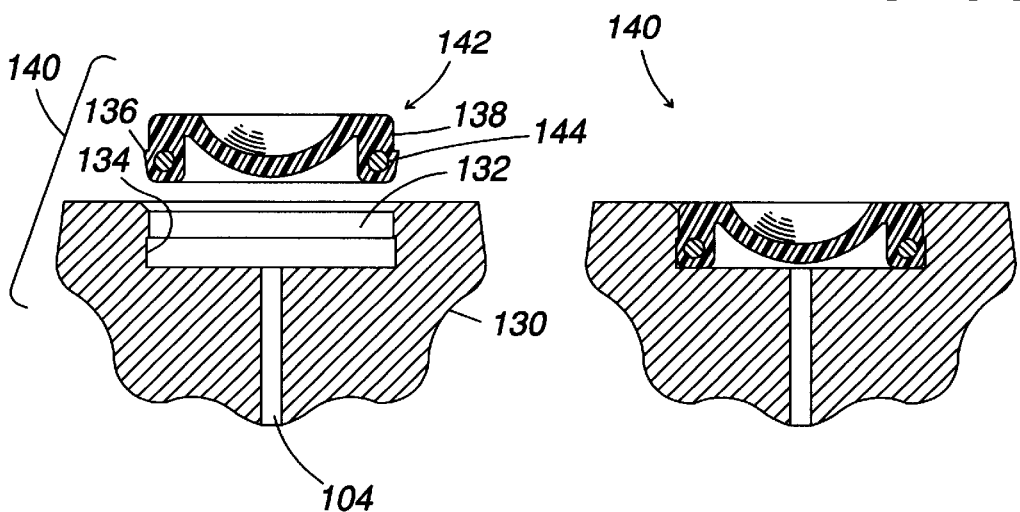
FIG. 9A  FIG. 9B  FIG. 9C  FIG. 10A  FIG. 10B

LUBRICANT RESERVOIR INSERT FOR A BEARING HOUSING

FIELD OF THE INVENTION

The present invention generally relates to the lubrication of bearings, and in particular, to indicating lubricant reservoirs for bearing housings of the pillow block or flange type.

BACKGROUND OF THE INVENTION

It is believed that as many as one-third of all bearing failures are the result of improper lubrication. Improper lubrication is particularly prevalent in the case of housing mounted bearings that are intended to be manually re-lubricated by means of a grease fitting. The present invention provides for a lubricant reservoir and a visual indicator for the lubricant level therein for use with pillow block or flange type bearing housings.

SUMMARY OF THE INVENTION

The present invention provides a bearing housing having a compact lubricant reservoir in communication with the bearing contained by the housing, whereby visual inspection of the reservoir indicates the level of lubricant reserve.

In one embodiment of the invention, a concave recess is provided in the surface of the housing, with a communicating passageway between the recess and the housed bearing. An invertible diaphragm is sealed to the annular surface of the concave recess. The invertible diaphragm has an at least partially convex lower surface facing the concave recess, with the lower surface extending into the concave recess in the substantial absence of lubricant (initial conformation).

In one embodiment, contoured thickness of the diaphragm is used to return the diaphragm to the initial conformation. In another embodiment, foam rubber located between the diaphragm and a metal shield supplies the restoring force to return the diaphragm to the initial conformation. A projection extending from the back of the diaphragm provides a simple and direct measure of the lubricant remaining in the reservoir.

It is an object of the present invention, therefore, to provide a compact and low profile lubricant reservoir for use with a bearing housing.

It is an object of at least one embodiment of the invention to provide a lubricant reservoir for a bearing housing having a visual indication as to the level of lubrication residing therein.

It is object of at least one embodiment of the invention to provide a compact lubricant reservoir mountable directly into the surface of a bearing housing.

BRIEF DESCRIPTION OF THE DRAWINGS

The above as well as other objects of the invention will become more apparent from the following detailed description of the preferred embodiments of the invention, when taken together with the accompanying drawings, wherein like numerals refer to like parts, in which:

FIG. 1A is a cross-sectional view of a reservoir in the initial (unfilled) conformation according to one embodiment of the instant invention, mounted in a bearing housing (shown in partial sectional view).

FIG. 1B is a cross-sectional view of the reservoir shown in FIG. 1A, shown in the filled conformation.

FIG. 2 is a perspective view of a pillow block type bearing housing (sans bearing) with the reservoir shown in FIG. 1B mounted in one preferred location.

FIG. 9A is a cross-sectional exploded view of a flush mounted reservoir, according to one embodiment of the invention.

FIG. 9B is a cross-sectional view of the assembled flush mounted reservoir of FIG. 9A, shown in the initial conformation.

FIG. 9C is a cross-sectional view of domed diaphragm according to one embodiment of the invention.

FIG. 10A is a cross-sectional exploded view of a flush mounted reservoir, according to one embodiment of the invention.

FIG. 10B is a cross-sectional view of the assembled flush mounted reservoir of FIG. 10A, shown in the initial conformation.

DESCRIPTION OF THE INVENTION

Figure 3A:
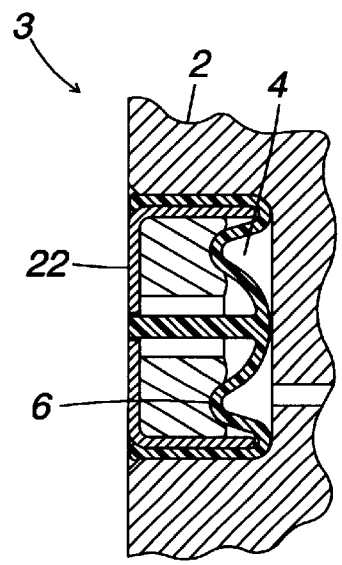
FIG. 3A is a cross-sectional view of a flush mounted reservoir according to another embodiment of the invention.

Turning now to FIG. 1A, a cross-sectional view of a reservoir 1 according to one embodiment of the invention is shown. Bearing housing 2 (partially shown) comprises recess 4, into which diaphragm 6 projects. Indicator 8 projects from the backside of diaphragm 6, and extends into the proximity of passageway 10 in the protective shield 12. The protective shield 12 traps and seals the annular periphery 14 of diaphragm 6 against the annular wall 16 of recess 4. In FIG. 1B, the recess 4 has been filled with lubricant 18 by means of conduit 20, which communicates to the housed bearing and grease fitting (not shown). Indicator 8 protrudes from the passageway 10 to give a visual indication of the fill level.

Foam rubber 250 located between diaphragm 6 and shield 12 supplies the restoring force to return the diaphragm 6 to the initial conformation.

FIG. 2 illustrates one location in which the reservoir 3 may be placed on the exterior surface of a pillow block type bearing housing 2. While the reservoir 3 may be placed in any location, it is preferred that it be placed so as to give the maintenance worker greasing the bearing a ready view of its condition.

Figure 3B:
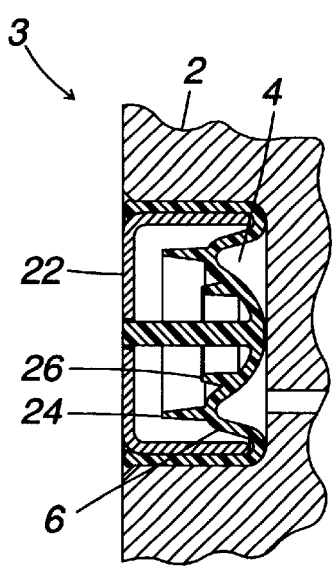
FIG. 3B is a cross-sectional view of a flush mounted reservoir having a diaphragm with integral spring rings for returning the diaphragm to the initial conformation.
Figure 3C:
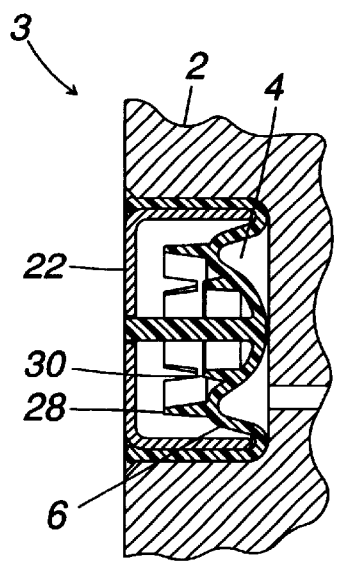
FIG. 3C is a cross-sectional view of a flush mounted reservoir having a diaphragm with notched integral spring rings for returning the diaphragm to the initial conformation.

Turning now to FIGS. 3A–C, an embodiment of the invention is shown wherein the recess 4 is extended into the housing 2 so that flush mounting of shield 22 is possible. In FIG. 3B, annular rings 24, 26 projecting from the backside of the diaphragm 6 serve to return the diaphragm to the initial conformation. In FIG. 3C, the annular rings 28, 30 are notched to reduce the spring rate.

Figure 4A:
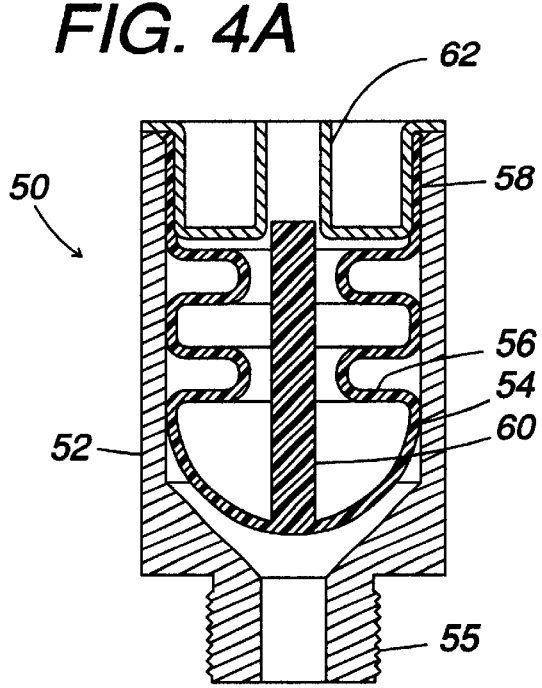
FIG. 4A is a cross-sectional view of a canister-mounted reservoir having a convoluted diaphragm, shown in the initial conformation.
Figure 4B:
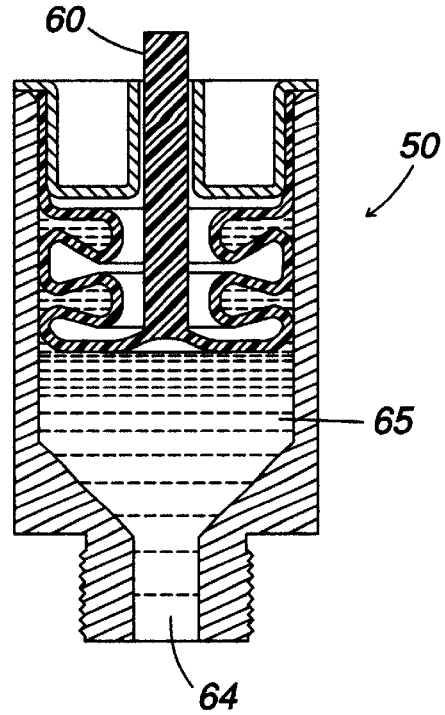
FIG. 4B is a cross-sectional view of a canister-mounted reservoir having a convoluted diaphragm, shown in the filled conformation.
Figure 5:
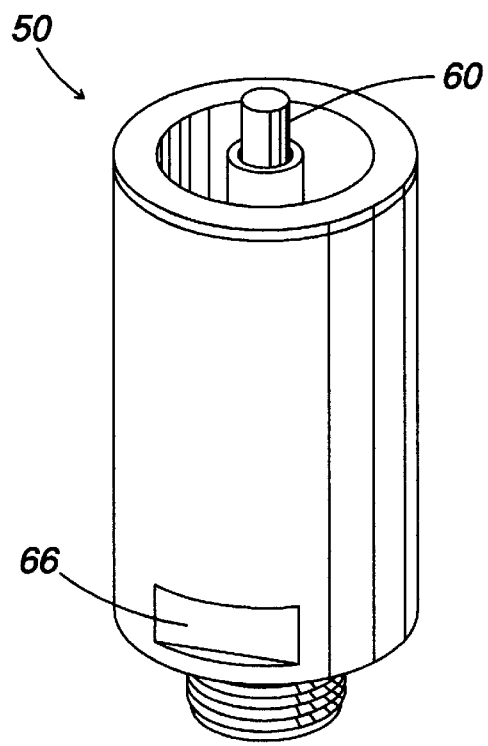
FIG. 5 is a perspective view of a canister reservoir as shown in FIG. 4B.
Figure 6:
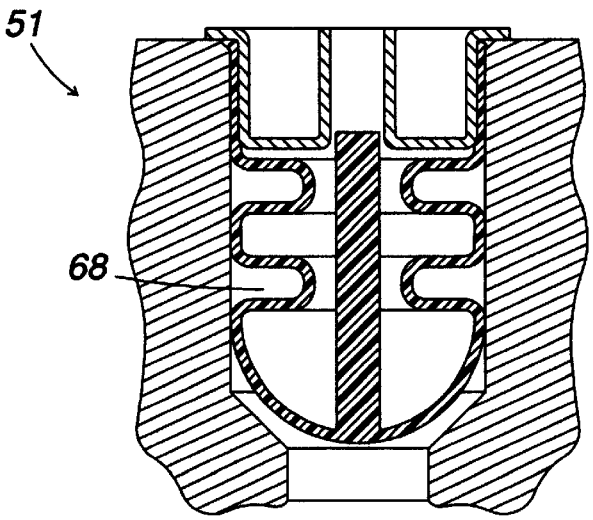
FIG. 6 is a cross-sectional view of a flush mounted reservoir having a convoluted diaphragm, shown in the initial conformation.

An alternative embodiment of the invention is illustrated in FIGS. 4A–5, useful where the bearing housing is not thick enough to accommodate a recess of sufficient depth, or for retrofit of existing bearings. In FIG. 4A, a reservoir in the initial conformation is shown generally as numeral 50. The reservoir comprises cylinder body 52, having a fitting 55 for attachment to a bearing housing. The fitting 55 would typically be threaded with standard pipe threads, but may also provide for a press fit into a hole provided in the bearing housing (not shown), or for welding, brazing, or adhesive attachment thereto. The diaphragm 54 is shown to be a convoluted tube having convolutions 56, an annular sealing section 58, and an indicator 60 extending from the rear surface thereof A sealing cup 62, pressure seals the diaphragm 54 annular sealing section 58 of the cylinder body 52. In FIG. 4B, the reservoir 50 is shown in the filled conformation, with grease 65 supplied through passageway 64, and indicator 60 extending through sealing cup 62 to indicate that the reservoir is filled. FIG. 5 is a perspective view of the reservoir of FIG. 4B, with wrench flat 66. Where the housing is sufficiently thick, the reservoir 51 may be entirely incorporated in the housing wall, as shown in FIG. 6, wherein the cylinder body is replaced by the recess 68.

Figure 7A:
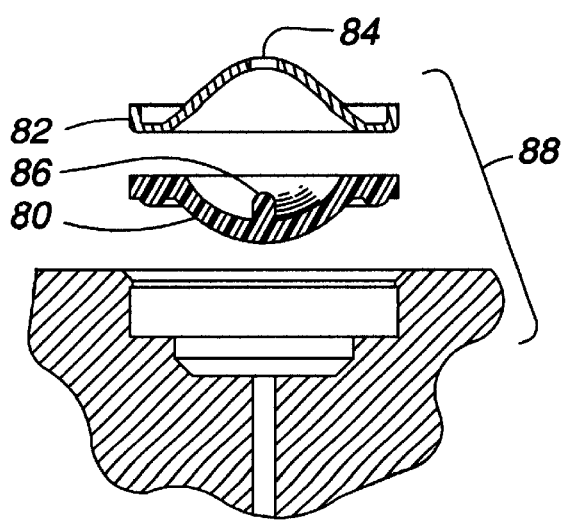
FIG. 7A is a cross-sectional exploded view of a flush mounted reservoir according to an embodiment of the invention.
Figure 7B:
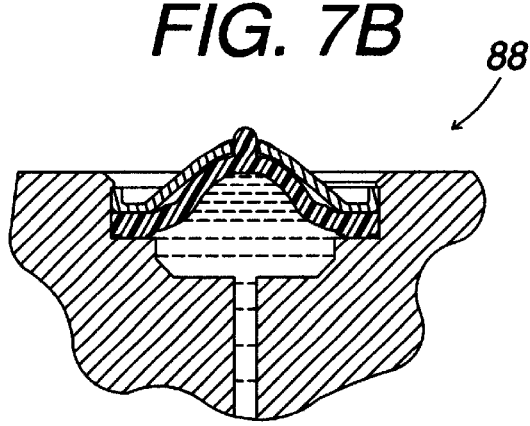
FIG. 7B is a cross-sectional view of the flush mounted reservoir of FIG. 7A, shown in the filled conformation.
Figure 7C:
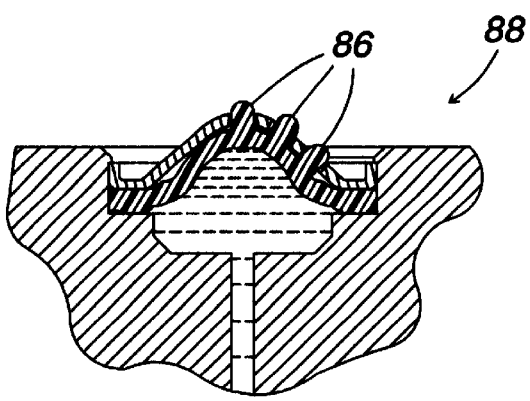
FIG. 7C is a cross-sectional view of an alternative embodiment to that of FIG. 7B, wherein a plurality of projections act as indicators of the fill state.
Figure 8A:
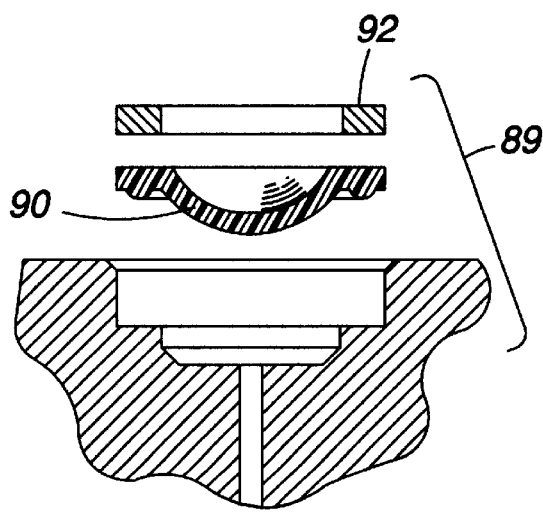
FIG. 8A is a cross-sectional exploded view of a flush mounted reservoir, according to another embodiment of the invention.
Figure 8B:
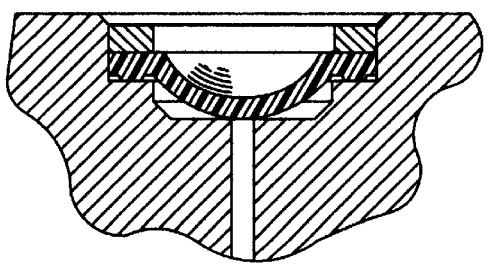
FIG. 8B is a cross-sectional view of the assembled flush mounted reservoir of FIG. 8A, shown in the initial conformation.

In FIGS. 7A and 7B, diaphragm 80, is sealed from above by domed shield 82, which has passageway 84, though which indicator 86 projects when reservoir 88 is in the filled conformation, as shown in FIG. 7B. Alternatively, the shield may comprise a transparent polymeric or elastomeric material for viewing (not shown). If the shield comprises a translucent material, the size of the contact area of the diaphragm 80 against the underside of the shield 82 would thereby indicate the filled or partially filled conformation. In FIG. 7C, a plurality of indicators 86 are used to indicate the fill status of the reservoir 88. A similar reservoir 89 is shown in FIGS. 8A and 8B, wherein diaphragm 90 is sealed from above by ring 92.

Turning now to FIG. 9A, a directly indicating reservoir 100 is shown in an exploded view to comprise recess 102, conduit 104, clamp/seal ring 106, and diaphragm 108. Diaphragm 108 comprises a domed section 110 extending towards and into recess 102, and annular ring 112 for sealing against the recess wall 114. The assembled reservoir is shown in FIG. 9B, in the initial conformation. In FIG. 9C, ribs 109 extending from the domed section 110 are used to produce an asymmetric stiffness, so that the domed section 100 is not bi-stable.

In another embodiment, shown in FIGS. 10A and 10B, a reservoir 140 comprising a one-piece dished diaphragm 142 is press fit into a recess 132 within bearing housing 130. The recess 132 preferably comprises an undercut 134 for capturing a lip 136 on the exterior annular sealing ring 138 of diaphragm 142. Optional wire element 144 may be used for stiffening the sealing ring 138.

Figure 11A:
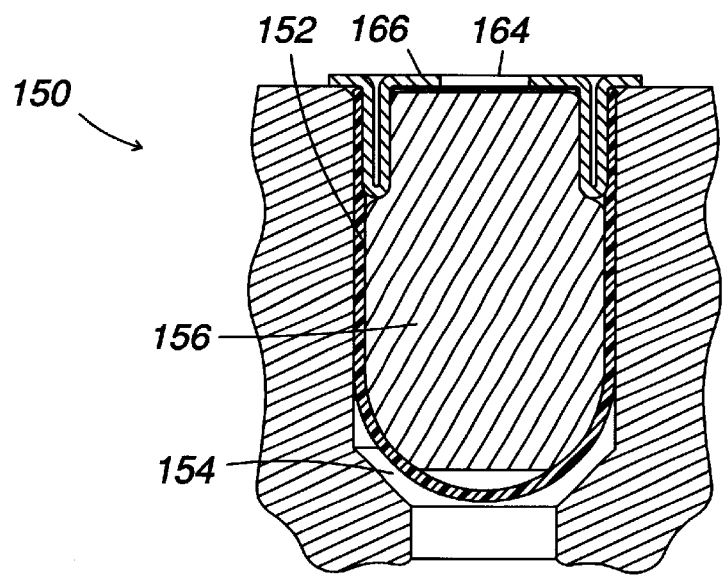
FIG. 11A is a cross-sectional view of a flush mounted reservoir according to another embodiment of the invention, shown in the initial conformation.
Figure 11B:
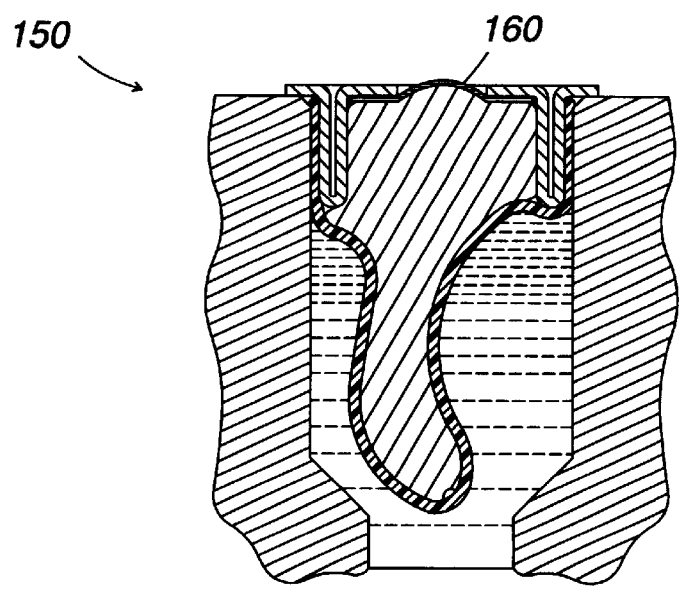
FIG. 11B is a cross-sectional view of the flush mounted reservoir shown in FIG. 11A, shown in a partially filled conformation.

In FIGS. 11A and 11B a reservoir 150 according to another embodiment of the invention is shown in the initial and filled conformations respectively. Diaphragm 152 comprises a hollow flexible tube extending into recess 154. Foam 156 within diaphragm 152 serves to provide a restoring force to return the reservoir to the initial conformation. A bulge 160 of foam 156 within passageway 164 in protective seal cap 166 serves to indicate the conformational state of the reservoir.

Figure 12A:
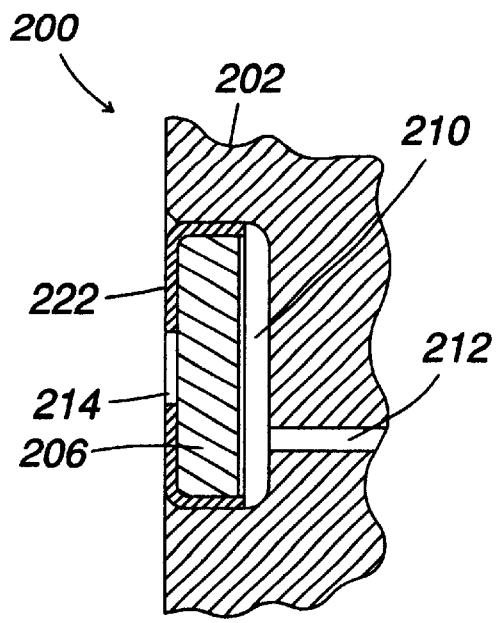
FIG. 12A is a cross-sectional view of the flush mounted reservoir according to another embodiment of the invention, shown in the initial conformation.
Figure 12B:
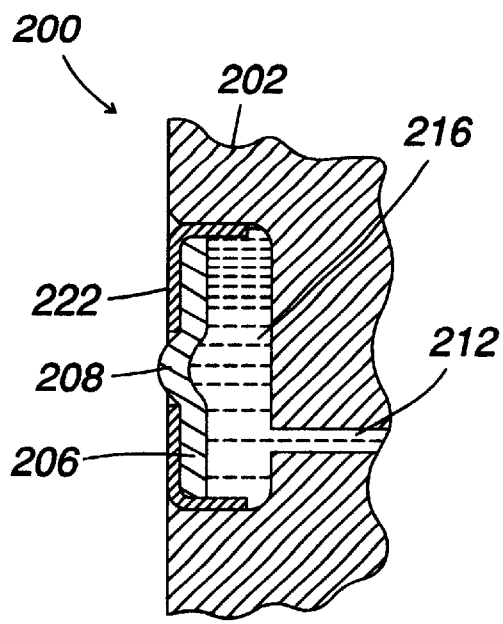
FIG. 12B is a cross-sectional view of the flush mounted reservoir shown in FIG. 12A, shown in the filled conformation.

In FIGS. 12A and 12B a reservoir 200 according to another embodiment of the invention is shown in the initial and filled conformations respectively. Foam element. 206 is adhesively bonded to the lower surface of shield 222, having passageway 214. Shield 222 forms a cup that press fits into the cylindrical recess 210 of housing 202, so as to produce an annular seal. In FIG. 12B, foam element 206 is compressed by the presence of lubricant 216, delivered to the cylindrical recess 210 by means of conduit 212. A bulge 208 of in the outer surface of foam element 206 into passageway 214 in shield 222 serves to indicate the conformational state of the reservoir.

Figure 13A:
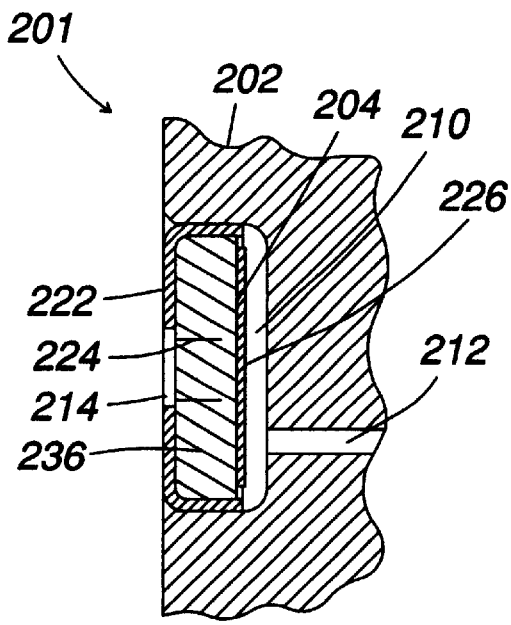
FIG. 13A is a cross-sectional view of the flush mounted reservoir according to another embodiment of the invention, shown in the initial conformation.
Figure 13B:
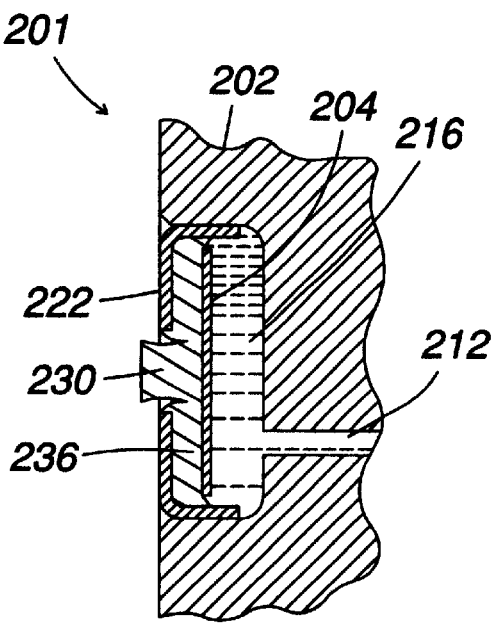
FIG. 13B is a cross-sectional view of the flush mounted reservoir shown in FIG. 12A, shown in the filled conformation.

In FIGS. 13A and 13B a reservoir 201 according to yet another embodiment of the invention is shown in the initial and filled conformations respectively. Foam element 236 is adhesively bonded to the lower surface of shield 222, having passageway 214. Shield 222 forms a cup that press fits into the cylindrical recess 210 of housing 202, so as to produce an annular seal. An optional rigid plate 226 is bonded to the inner surface of foam element 236. A circular (or other closed shape) incision 224 extends in from the outer surface of foam element 236, but does not penetrate it completely. In FIG. 12B, foam element 236 is compressed by the presence of lubricant 216, delivered to the cavity 210 by means of conduit 212. Bulge 230 of in the outer surface of foam element 236 into passageway 214 in shield 222 serves to indicate the conformational state of the reservoir. Incision 224 (which may optionally be molded into foam element 236) serves to allow bulge 230 to extend further outwards to give a more reliable indication of the conformational state.

Diaphragm materials used in the various embodiments may comprise any material sufficient flexible and resistant to the lubricants used in bearings. Such materials may include elastomers taken from the non-exclusive list consisting of polychloroprene, poly (butadiene-styrene), poly (styrene-butadiene-styrene), poly (ethylene-propylene), silicone, fluoroelastomer, chlorosulfonated polyethelene elastomer, perflouroelastomer, acrylic elastomers, polyurethane, polyisoprene, and/or polymers taken from the non-exclusive list consisting of PTFE, ionomer, polyaramid and polyamide. Foam for use in the various embodiments of the invention may comprise any polymer or elastomer of sufficient compression set and heat resistance to return the diaphragm substantially to the initial conformation, and may comprise any of the polymers or elastomers listed above. An open cell foam is preferred, which would typically be coated at least on its inner surface so as to provide a barrier to the passage of lubricant. Foams having closed cells and mixtures of closed and open cells may also be used, especially where higher spring rates are desired. Shield materials for use with the present invention are preferably comprised of a metal such as aluminum, magnesium, copper, brass, and steel, but may also be comprised of a stiff polymer or elastomer.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

I claim:

1. A reservoir for lubricant, comprising:
    a housing for rotatably mounting a bearing, said housing having an exterior surface;
    a concave recess in said housing, said concave recess open to said exterior surface of said housing, said concave recess comprising an annular surface;
    a conduit allowing fluid communication between said concave recess and said bearing;
    a diaphragm sealed to said annular surface of said concave recess, said diaphragm having at least a partially convex lower surface facing said concave recess, and an exterior surface facing away from said concave recess, said diaphragm having an initial conformation when the reservoir is substantially empty of lubricant, and a filled conformation when the reservoir is substantially filled with lubricant;
    a shield exterior to said exterior surface of said diaphragm, said shield having at least one passageway therethrough; and
    at least one indicator having a distal end, said indicator projecting from said exterior surface of said diaphragm, said indicator aligned with said passageway, said distal end having a first position relative to said concave recess in said initial conformation, said distal end having a second position relative to said concave recess in said filled conformation, said second position distal to said first position relative to said concave recess, and said distal end extending into or through said passageway in said second position.

2. A reservoir for lubricant as recited in claim 1, wherein said diaphragm comprises a rubber or elastomer.

3. A reservoir for lubricant as recited in claim 2, wherein said rubber or elastomer is selected from a group of materials consisting of polychloroprene, poly (butadiene-styrene), poly (styrene-butadiene-styrene), poly (ethylene-propylene), silicone, fluoroelastomer, chlorosulfonated polyethelene elastomer, perflouroelastomer, acrylic elastomers, polyurethane, and polyisoprene.

4. A reservoir for lubricant as recited in clam 1, wherein said shield is at least partially transparent or translucent.

5. A reservoir for lubricant as recited in claim 1, wherein said diaphragm comprises a polymeric material.

6. A reservoir for lubricant as recited in claim 5, wherein said polymeric material is selected from a group of materials consisting of PTFE, ionomer, polyaramid and polyamide.

7. A reservoir for lubricant as recited in claim 1, wherein said diaphragm has no holes or passageways therethrough.

8. A reservoir for lubricant as recited in claim 1, wherein said diaphragm has a circumferential region sealed to said annular surface.

9. A reservoir for lubricant as recited in claim 1, said diaphragm reverting from said filled conformation to said initial conformation as the lubricant contained within the reservoir is depleted, without the action of an auxiliary spring element.

10. A reservoir for lubricant, comprising:
    a housing for rotatably mounting a bearing, said housing comprising an exterior surface;
    a concave recess in said housing, said concave recess open to said exterior surface of said housing, said concave recess comprising an annular surface;
    a conduit allowing fluid communication between said concave recess and said bearing;
    a diaphragm sealed to said annular surface, said diaphragm comprising an exterior surface facing away from said concave recess, said diaphragm comprising an initial conformation when the reservoir is substantially empty of lubricant, and a filled conformation when the reservoir is substantially filled with lubricant;
    a shield exterior to said exterior surface of said diaphragm; and
    an indicator having a first position relative to said concave recess in said initial conformation, and a second position relative to said concave recess in said filled conformation, wherein said second position is distal to said first position relative to said concave recess.

11. A reservoir for lubricant, as recited in claim 10, wherein said shield seals said diaphragm to said annular surface.

12. A reservoir for lubricant, as recited in claim 10, wherein said indicator extends from said exterior surface of said diaphragm.

13. A reservoir for lubricant, as recited in claim 12, wherein said shield comprises a passageway therethrough, and wherein said indicator comprises a distal end, wherein said distal end extends into or through said passageway when said diaphragm is in said filled conformation.

14. A reservoir for lubricant, as recited in claim 10, wherein said shield comprises a passageway therethrough.

15. A reservoir for lubricant, as recited in claim 10, wherein said indicator comprises a rubber or elastomer.

16. A reservoir for lubricant, as recited in claim 15, wherein said indicator wherein said rubber or elastomer is foamed.

17. A reservoir for lubricant, as recited in claim 16, wherein said indicator resides between said shield and said diaphragm.

18. A reservoir for lubricant, as recited in claim 10, wherein said diaphragm comprises rubber or elastomer.

19. A reservoir for lubricant as recited in claim 10, further comprising foam rubber or elastomer between said shield and said diaphragm.

20. A reservoir for lubricant as recited in claim 10, further comprising spring rings between said shield and said diaphragm.

21. A reservoir for lubricant, as recited in claim 10, wherein said diaphragm is invertible.

22. A reservoir for lubricant as recited in claim 10, further comprising a bearing housing.

* * * * *